Jan. 18, 1938.  McKINLEY PALMER  2,105,497
COMBINED VENTILATOR AND AIR CLEANER FOR MOTOR VEHICLES
Filed Nov. 27, 1935
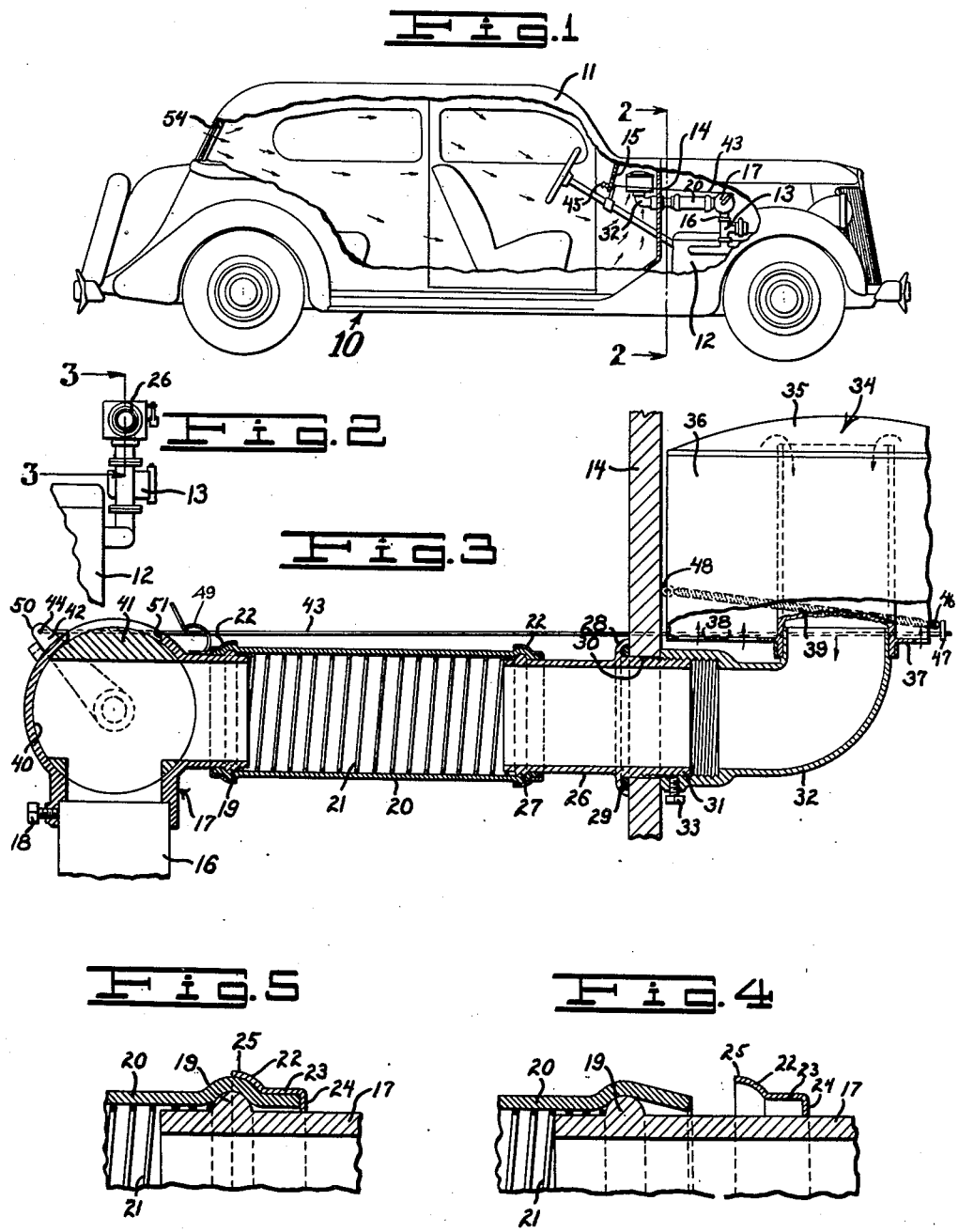
INVENTOR.
McKINLEY PALMER
BY
ATTORNEY.

Patented Jan. 18, 1938

2,105,497

UNITED STATES PATENT OFFICE 2,105,497

COMBINED VENTILATOR AND AIR CLEANER FOR MOTOR VEHICLES

McKinley Palmer, Beverly Hills, Calif.

Application November 27, 1935, Serial No. 51,837

3 Claims. (Cl. 98—2)

This invention relates to combined ventilators and air cleaners for motor vehicles.

The general object of the invention is to provide an air cleaning device which is adapted to be connected to the carburetor of an internal combustion engine, and wherein the air cleaner is mounted so that air will be drawn into the cleaner from a location remote from the carburetor.

A more specific object of the invention is to provide a motor vehicle including a body having a driver's compartment and having an internal combustion engine thereon, and wherein the carburetor of the engine is connected to an air cleaner which is disposed in the driver's compartment of the vehicle.

Another object of the invention is to provide a novel means for ventilating the body of a motor vehicle so that tobacco smoke, oil fumes, etc. may be withdrawn therefrom, and also to provide means which will prevent sand or other foreign substances from passing into the motor.

Other objects and the advantages of the invention will be apparent from the following description taken in connection with the accompanying drawing, wherein:

Fig. 1 is a side elevation, with parts broken away, showing my invention;

Fig. 2 is a section in detail taken on line 2—2 of Fig. 1;

Fig. 3 is a section on an enlarged scale taken on line 3—3 of Fig. 2;

Fig. 4 is an enlarged, fragmentary, section showing the manner in which the flexible hose is connected to the air cleaner coupling; and Fig. 5 is a view similar to Fig. 4 showing the connection completed.

Referring to the drawing by reference characters I have shown my invention as embodied in a motor vehicle indicated generally at 10. This vehicle is shown as provided with the usual closed passenger compartment 11 and with an engine 12 which includes a carburetor 13.

The vehicle further includes a front panel 14 which divides the engine compartment from the passenger compartment and the body is also provided with an instrument panel 15.

The carburetor 13 is shown as connected by a pipe 16 with an elbow 17 which is held in place by means of a set screw 18. The elbow at the end remote from the pipe 16 is provided with an outwardly directed peripheral bead 19. The elbow 17 is inserted in a flexible rubber hose 20 which has a resilient helical reinforcement member 21 therein with the bead 19 engaging the interior of the hose 20.

To secure the parts in assembled position I provide a clamping collar 22 which includes a cylindrical portion 23, an end flange 24, and a binding portion 25. The cylindrical portion 23 is substantially the same size as the exterior of the hose 20, while the inner periphery of the end flange 24 is of such a diameter that it has a tight, sliding, fit with the exterior of the elbow 17. The collar 22 is made of material which is more or less resilient, so that when this collar is driven to the position shown in Fig. 5 the end of the hose 20 will be held in tight engagement against the bead 19.

The end of the hose 20 remote from the elbow 17 is connected to a tubular fitting 26 which is cylindrical in shape and is provided with a bead 27, similar to the bead 19, and the hose is fastened to the fitting 26 by means of a collar 22 like the collar previously described.

The fitting 26 is provided with an outwardly directed flange 28 which includes a curved end portion in which a sealing gasket 29 is disposed. The fitting 26 is shown as passing through an aperture 30 in the panel 14 and has a threaded extremity 31 which is fitted into an air inlet member or elbow 32 with the parts held together by a set screw 33. The portion of the elbow 32 which engages the threads 31 includes an end which engages the panel 14 and serves to draw the gasket 29 into a sealing position.

As is customary the engine 12 is resiliently mounted on the vehicle 10 and vibrates independently thereof. By using the flexible hose 20 and the flexible reinforcement member 21 these vibrations are prevented from reaching the fitting 26, panel 14, and the air cleaner 34.

As shown the free end of the air inlet elbow 32 is directed upwardly and receives an air cleaning device which includes a receptacle 34. This receptacle is provided with a top wall 35 and a side wall 36, both of which are imperforate, and the receptacle is also provided with a lower wall 37 which includes spaced apertures 38 through which the air enters. The receptacle 34 is provided with a cylindrical inner member 39 which has an open top disposed just below the top 35 of the receptacle 34.

The construction is such that when the engine is operating air is drawn through the apertures 38 into the receptacle 34, thence through the cylindrical member 39 into the elbow 32 through the fitting 26 into the hose 20, whereupon the air passes through the elbow 17 and through the pipe 16 to the carburetor 13.

The elbow 17 has a transverse cylindrical bore

40 therein in which is rotatively positioned a two way valve rotor 41. The rotor 41 is adapted to be rotated through an arc of 90° by an arm 42. A control rod 43 is connected to the arm 42 as at 44 and extends through the panels 14 and 15 and terminates in a control button 45.

A spring 46 has one end secured to the rod 43 as at 47 and the other end secured to the panel 14 as at 48. The spring 46 resiliently urges the valve 41 toward the position shown in Fig. 3 in which communication is afforded between the pipe 16 and the tube 20 and the carburetor draws air from the interior of the car. When it is desired to draw air from the engine compartment the control button 45 is pulled outwardly, moving the rod 43 which rotates the arm 42 and the valve rotor 41 clockwise 90°. The arm 42 is held in this position by a spring 49 which engages the rounded end 50 of the arm 42.

In this position the passage between the elbow 17 and the tube 20 is closed by the rotor 41 and communication is afforded from the pipe 16 through an aperture 51 to the engine compartment.

As the air is drawn into the receptacle 34, tobacco smoke, oil fumes, etc., are drawn from the car body into and through the carburetor so that the air in the body remains pure. If desired the vehicle body may be provided with a ventilator aperture 54 in the rear thereof so that more ventilation for the rear of the vehicle may be secured.

From the foregoing description it will be apparent that I have provided a novel combined ventilator and air cleaner for automobiles which is simple in construction and highly efficient in use.

Having thus described my invention I claim:

1. In an automobile, an engine, a closed body compartment, a partition between the engine and compartment, said partition having an aperture therethrough, a tubular member positioned in said aperture, a gasket arranged about the tubular member and engaging the partition, said tubular member having a curved flange thereon engaging said gasket, the end of said tubular member in the driver's compartment being threaded, an elbow threadedly engaging said threaded portion of the tubular member, the end of said elbow engaging said partition about said aperture, a set screw passing through said elbow and engaging said tubular member, an air cleaner mounted on said elbow, said elbow constituting an air inlet, said tubular member having a bead thereon adjacent the end thereof which is disposed nearest to said engine, a flexible conduit having its end disposed over said bead on said tubular member, a clamp collar on said tubular member engaging said flexible conduit to effect a seal, a valve member, means to connect the valve member to the carburetor, said valve member including an inlet portion, said flexible hose engaging said inlet portion, said valve member having an aperture in one wall leading to the atmosphere, a valve in said valve member, said valve in one position affording communication between the conduit and the carburetor and in another position affording communication between the carburetor and the atmosphere and means to move said valve.

2. In an automobile, an engine, a closed body compartment, a partition between the engine and compartment, said partition having an aperture therethrough, a tubular member positioned in said aperture, an elbow at the inner end of the tubular member, an air cleaner mounted on said elbow, said elbow constituting an air inlet, a flexible conduit disposed on said tubular member, a clamp collar on said tubular member engaging said flexible conduit to effect a seal, a valve member, means to connect the valve member to the carburetor, said valve member including an inlet portion, said flexible hose engaging said inlet portion, said valve member having an aperture in one wall leading to the atmosphere, a valve in said valve member, said valve in one position affording communication between the conduit and the carburetor and in another position affording communication between the carburetor and the atmosphere and means to move said valve.

3. In an automobile, an engine, a closed body compartment, a partition between the engine and compartment, said partition having an aperture therethrough, a tubular member positioned in said aperture, a gasket arranged about the tubular member and engaging the partition, said tubular member having a flange thereon engaging said gasket, the end of said tubular member in the driver's compartment being threaded, an elbow threadedly engaging said threaded portion of the tubular member, the end of said elbow engaging said partition about said aperture, a set screw passing through said elbow and engaging said tubular member, an air cleaner mounted on said elbow, said elbow constituting an air inlet, a flexible conduit disposed on said tubular member, a clamp collar on said tubular member engaging said flexible conduit to effect a seal, a valve member, means to connect the valve member to the carburetor, said valve member including an inlet portion, said flexible hose engaging said inlet portion, said valve member having an aperture in one wall leading to the atmosphere, a valve in said valve member, said valve in one position affording communication between the conduit and the carburetor and in another position affording communication between the carburetor and the atmosphere and means to move said valve.

McKINLEY PALMER.